Feb. 3, 1953
E. F. SHELL
2,627,393
CONTROL ARRANGEMENT FOR AUXILIARY
COMPARTMENTS FOR REFRIGERATORS
Filed Dec. 29, 1950
2 SHEETS—SHEET 1
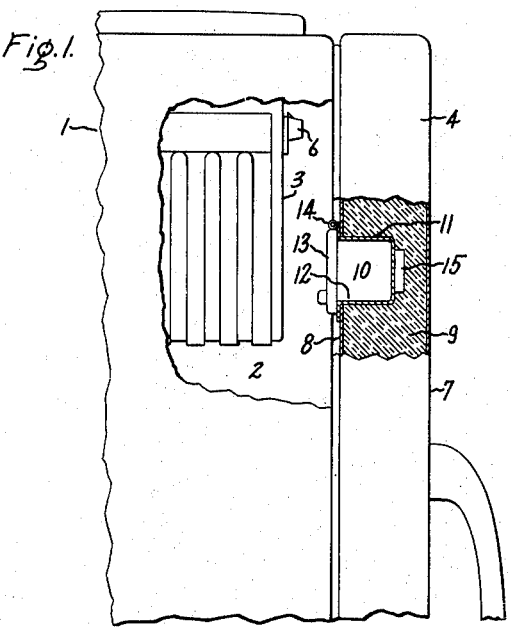
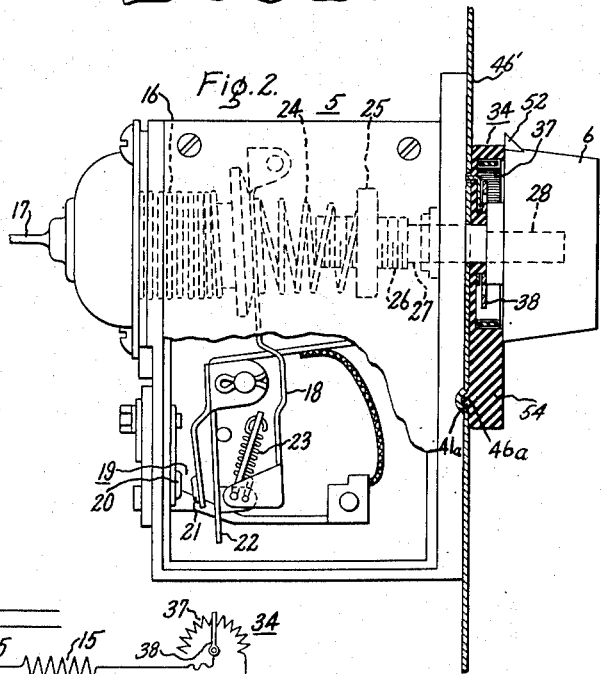
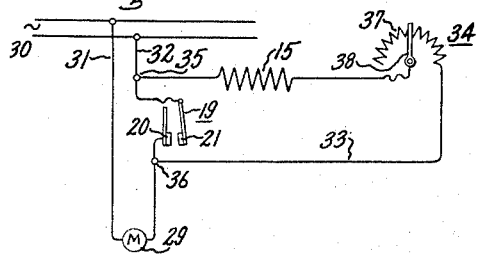
Inventor:
Ernest F. Shell,
by William C. Edwards
His Attorney.

Feb. 3, 1953 E. F. SHELL 2,627,393
CONTROL ARRANGEMENT FOR AUXILIARY
COMPARTMENTS FOR REFRIGERATORS
Filed Dec. 29, 1950 2 SHEETS—SHEET 2
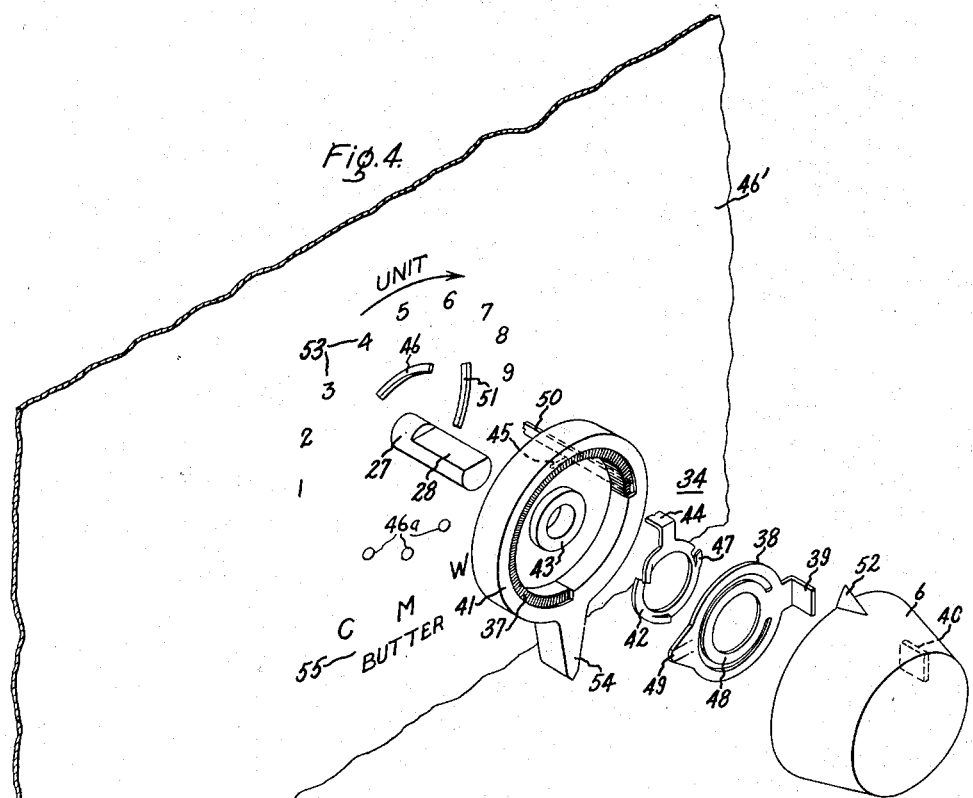
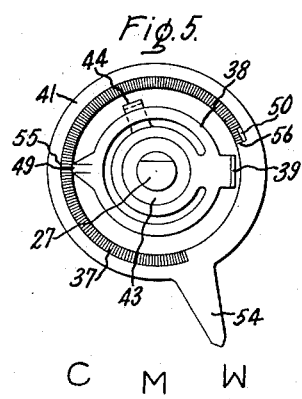
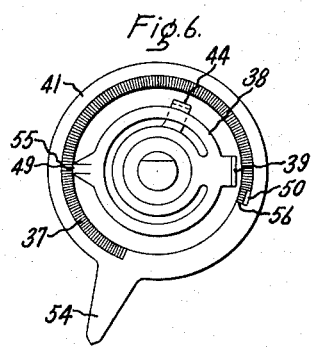
Inventor:
Ernest F. Shell,
by William B. Edwards Jr.
His Attorney.

Patented Feb. 3, 1953

2,627,393

UNITED STATES PATENT OFFICE 2,627,393

CONTROL ARRANGEMENT FOR AUXILIARY COMPARTMENTS FOR REFRIGERATORS

Ernest F. Shell, Erie, Pa., assignor to General Electric Company, a corporation of New York Application December 29, 1950, Serial No. 203,466

12 Claims. (Cl. 257—3)

1

My invention relates to refrigerator cabinets and more particularly to arrangements for controlling the heating of auxiliary compartments used within refrigerator cabinets for maintaining foods, such as butter or the like, at a temperature higher than that of the main refrigerated compartment.

Auxiliary compartments are sometimes provided in household refrigerators and maintained at a temperature higher than that of the main refrigerated food storage compartment of the refrigerator for storing foods, such as butter and the like, at a higher temperature at which the butter, for example, spreads easily. Such auxiliary compartments are thermally insulated from but are generally in some communication with the main refrigerated compartment, and a heater may be provided for maintaining the auxiliary compartment at a satisfactory higher temperature. The heater may be controlled, for example, by a thermostat responsive to the temperature of the auxiliary compartment for maintaining the desired temperature. Such a thermostatic control, while quite satisfactory for maintaining the desired temperature in the auxiliary compartment, has the disadvantage of being relatively expensive. A simplified arrangement for heating the auxiliary compartment by energizing the heater when the refrigerating unit is off is disclosed in a copending application of Alfred G. Janos Serial No. 203,391, filed December 29, 1950, and assigned to the assignee of the present invention. Since the refrigerating unit usually runs a greater proportion of the time when the ambient temperature is high, which is a condition when less heating of the auxiliary compartment is required, this simplified arrangement for energizing the heater, compensates satisfactorily for varying ambient temperatures and provides for maintaining an auxiliary compartment temperature within the range satisfactory for butter spreading. However, refrigerators are usually provided with an adjustable control by which the user can vary the temperature of the evaporator to maintain a lower or higher temperature in the refrigerated compartment. The adjustable control acts in a negative manner from the standpoint of maintenance of proper temperatures within the auxiliary compartment since, for example, setting the adjustable control for maintaining a lower temperature in the refrigerator compartment results in the operation of the refrigerating unit a greater proportion of the time and hence in smaller energization of the heater at a time when because the temperature of the

2 refrigerated compartment is lower and the auxiliary compartment is in communication therewith, a greater amount of heating of the auxiliary compartment is required. By my invention I have provided an improvement of the arrangement of the above-identified Janos application whereby compensation is introduced for changes in the setting of the control for the refrigerated compartment so that a satisfactory temperature is maintained within the auxiliary compartment despite any changes in the setting of the control.

It is an object of my invention to provide a refrigerator cabinet having a higher temperature auxiliary compartment therein and including an improved arrangement for maintaining the auxiliary compartment at a proper temperature.

It is another object of my invention to provide a refrigerator cabinet including a main refrigerated compartment and an auxiliary compartment in communication therewith and maintained at a higher temperature and including an improved arrangement for compensating for changes in the temperature of the refrigerated compartment.

It is a further object of my invention to provide a refrigerator cabinet having a higher temperature auxiliary compartment therein and including an improved arrangement for adjusting the temperature of the auxiliary compartment.

Further objects and advantages of my invention will become apparent as the following description proceeds and the features of novelty which characterize my invention will be pointed out with particularity in the claims annexed to and forming part of this specification.

In carrying out the objects of my invention I provide a heater for the auxiliary compartment which is energized only when the refrigerating unit is idle. A rheostat is arranged in series with the heater and this rheostat is associated with the adjustable control for the refrigerated compartment in such a manner that the intensity of the energization of the heater is automatically increased when the control is set for a lower temperature of the refrigerated compartment and vice-versa. A second adjustment of the rheostat is provided to afford adjustment by the user of the temperature range to be maintained in the auxiliary compartment.

For a better understanding of my invention reference may be had to the accompanying drawings in which Fig. 1 is a view, partly broken away, of a portion of a refrigerator cabinet incorporating an auxiliary compartment; Fig. 2 is a structural view of the control incorporating an embodiment of my invention; and Fig. 3 is a circuit diagram illustrating my invention; Fig. 4 is an exploded view of the compensating and adjusting mechanism shown in Fig. 2; Fig. 5 is a view of one position of the adjusting mechanism for varying the temperature of the auxiliary compartment; and Fig. 6 is a view of the adjusting mechanism in a second position.

Referring to the drawings, there is shown a refrigerator cabinet 1 providing an interior refrigerated food storage compartment 2. The refrigerated compartment 2 is cooled by a cooling unit or evaporator 3 disposed in the upper portion of this compartment. The compartment 2 is closed by a door 4. The temperature of the evaporator 3, and hence of the refrigerated compartment 2 cooled thereby, is governed by a control 5 having a knob 6 for adjusting the setting thereof.

The door 4 includes an outer wall 7 and a spaced inner wall 8, the space between the walls being filled with suitable heat-insulating material 9. An auxiliary compartment 10, defined by a wall 11, is mounted on the inner wall 8 of the door and is thermally insulated with respect to the refrigerated compartment 2 by the heat-insulating material 9 surrounding the wall 11. The auxiliary compartment 10 communicates with the refrigerated compartment 2 through the access opening 12, this opening being closed by a door 13 hinged at 14. The auxiliary compartment 10 is provided for the preservation at a somewhat higher temperature than that existing in the refrigerated compartment 2 of foods, such as butter and the like, which may require slightly higher temperature for satisfactory spreading. To maintain the auxiliary compartment 10 at this higher temperature, say in the range from 55 degrees Fahrenheit to 65 degrees Fahrenheit, an electric heater shown generally at 15, is mounted on the wall 11 of the auxilary compartment 10. Power may be supplied to the door and to the heater 15 in any suitable manner, for example, by an arrangement such as that disclosed in Patent 2,522,989, issued in the name of Richard J. Carbary, and assigned to the same assignee as the present invention. Since the details of the structure for supplying power to the door and to the heater are not part of the present invention they have not been illustrated in the drawing.

The adjustable control 5 is of a conventional type, for example that shown in Patent 2,050,833, issued in the name of John B. Ford and assigned to the same assignee as the present invention. The control includes a bellows 16 which is connected by a tube 17 with a thermostatic bulb (not shown) adapted to be positioned in engagement with the evaporator 3 in a manner well known in the art. The bellows 16 is adapted to move a pivoted arm 18 for actuating a snap-acting mechanism to open and close a switch 19 including a stationary contact 20 and a movable contact 21. This snap-acting mechanism includes a second pivoted arm 22 which carries the movable contact 21 and an overcenter spring 23 which snaps the mechanism between the open and closed positions of the switch 19. The movement of the bellows 16 is opposed by a biasing spring 24 aligned with the bellows. In order to vary the biasing force exerted by the spring 24 and hence to vary the temperature of the evaporator required to move the switch 19 to its open position, the position of a cap 25 bearing against one end of the spring 24 is varied by a threaded rod 26 formed on a shaft 27. The shaft 27 is turned by the adjusting knob 6 which engages a flat side 28 on the shaft to prevent relative rotation of the shaft and the knob. It can be seen that increasing the compression of the spring 24 by a counterclockwise rotation of the knob 6, a left-hand thread being provided on the threaded rod 26, increases the temperature which must be reached by the evaporator in order, through expansion of the volatile fluid in the thermostatic bulb and the tube 17, to effect a sufficient expansion of the bellows 16 to move the arm 18 far enough to the right to snap the switch 19 to its closed position. Conversely, clockwise rotation of the knob 6 decreases the compression of the spring and the switch 19 is closed at a lower temperature of the evaporator, maintaining a lower temperature in a refrigerated compartment 2.

Liquid refrigerant is supplied to cool the evaporator 3 by a refrigerating unit (not shown) which is driven by an electric motor 29, shown in the circuit diagram in Fig. 3. The refrigerating unit, or more specifically the motor 29 thereof, is energized from any suitable source of power 30 through lines 31, 32. The switch 19 is interposed in the line 32 to control the energization of the refrigerating unit and hence the supplying of refrigerant to the evaporator 3. The opening and closing of this switch is governed by the control 5 in the manner previously described to maintain a desired temperature within the refrigerated compartment 2, which temperature may be adjusted by the user by turning the knob 6.

The heater 15 is connected in a circuit 33 which comprises the heater 15 in series with a rheostat 34. The circuit 33 is connected at 35, 36 across the terminals of the switch 19. The circuit 33 is therefore shorted when the switch 19 is closed. When the switch 19 is in its open position the circuit 33 is connected to the power source 30 in series with the motor 29 of the refrigerating unit through the lines 31, 32. The heater 15 is therefore energized when the refrigerating unit is deenergized, that is when the switch 19 is open, and the heater 15 conversely is deenergized when the refrigerating unit is energized, that is when the switch 19 is closed. As the ambient temperature rises the refrigerating unit normally is required to operate a greater proportion of the time in order to maintain the temperature of the refrigerated compartment 2 at a satisfactory point. At the same time, a rise in ambient temperature, because of the resultant increased heat leakage into the auxiliary compartment 10, results in a smaller requirement for heat to be supplied by the heater 15. The broad idea described above of a heater which is energized when the refrigerating unit is idle and deenergized when the refrigerating unit is running is not my invention but is described and claimed in the aforementioned copending application of Alfred G. Janos, Serial No. 203,391, filed December 29, 1950.

The rheostat 34 connected in series with the heater 15 is provided to compensate for adjustments in the setting of the control 5 by the user to maintain varying temperatures in the refrigerated compartment 2. As shown structurally in Fig. 2, schematically in Fig. 3 and in exploded view of Fig. 4 the rheostat 34 includes an arcuate resistor 37 and a movable arm 38 adapted to be moved along the resistor 37 to incorporate varying amounts of resistance in the series circuit 33 which includes the heater 15. The arm 38 is mounted on the shaft 27 which, as explained previously, is turned by the knob 6 for providing various temperature settings of the evaporator and the refrigerated compartment 2 at the discretion of the user. The arm 38 includes an integral tab 39 which is received in a recess 40 within the knob 6 to prevent relative rotation of the knob, and hence of the shaft 27, and the arm 38. Because of this mounting of the arm 38 on the shaft 27 the rheostat 34 is automatically adjusted each time that the user turns the knob 6 to adjust the control for varying the temperature setting thereof, and this feature is used to provide automatic compensation of the auxiliary compartment 10 for variations in the temperature set for the refrigerated compartment 2.

When the temperature of the refrigerated compartment 2 decreases there is a corresponding tendency for a reduction in temperature of the auxiliary compartment 10 because this auxiliary compartment is adjacent the refrigerated compartment 2 and in communication therewith. Therefore, in order to maintain the temperature of the auxiliary compartment within the desired range it is necessary to supply additional heat to the auxiliary compartment by the heater 15 when the temperature of the refrigerated compartment 2 is lowered. By my arrangement incorporating the rheostat 34 this increased heat supply under the above condition is automatically secured. Thus, for example, when the knob 6 is rotated in a clockwise direction to reduce the compression of the spring 24 and hence to reduce its biasing force so that the switch 19 closes to energize the refrigerating unit at a lower evaporator temperature and hence the temperature of the refrigerated compartment 2 is lowered, the arm 38 is simultaneously rotated in a clockwise direction to reduce the amount of the resistor 37, that is, the amount of resistance included in the series circuit 33 with the heater 15. Accordingly, when the refrigerating unit stops as the switch 19 opens, the current through the heater 15 increases over that flowing during the previous setting of the rheostat 34 and hence an increased amount of heat is supplied by the heater 15 to the auxiliary compartment 10. This compensates for the reduction in the temperature of the refrigerated compartment and facilitates maintenance of the temperature of the auxiliary compartment within the desired range. Conversely, when the knob 6 is rotated in a counterclockwise direction to increase the compression of this spring 24 and its biasing force so that a higher temperature of the evaporator 3 is achieved before the switch 19 closes to energize the refrigerating unit, the arm 38 of the rheostat is simultaneously moved in a counterclockwise direction to incorporate an increased amount of the resistor 37, that is an increased amount of resistance in the series circuit with the heater 15. Accordingly, the adjustment of the knob 6 which effects an increase in the temperature of the refrigerated compartment 2 simultaneously effects a reduction in the current flowing through the heater 15 and hence reduces the heat supplied by the heater 15 to the auxiliary compartment 10, compensating for the rise in the temperature of the refrigerated compartment 2 and facilitating maintenance of the temperature within the auxiliary compartment within the desired temperature range.

Details of construction are shown in the exploded view in Fig. 4. Referring to Fig. 4, the arcuate resistor 37 is mounted within a housing 41 of suitable electrical-insulating material, this resistor being received within a recess in the housing so as to be fixed relative thereto. The circuit 33 includes the arm 38 and a cooperating contact ring 42. The contact ring 42 is also mounted within the housing 41 being supported on a boss 43 formed integral with the housing. The contact ring 42 includes an ear 44 adapted to project through a slot 45 in the housing 41 and through a second slot 46 in the face 46' of the control 5. The contact ring 42 includes a plurality of contact fingers 47 which continuously engage an annular section 48 of the arm 38 to provide a current path therebetween. The arm 38 includes a tip 49 which engages the arcuate resistor 37 for varying the amount of resistance in the circuit 33. The resistor 37 is provided with a rearwardly extending contact prong 50 which projects through a slot 51 in the face 46' of the control.

One side of the heater 15 is connected in any suitable manner to the ear 44 for supplying current through the heater 15 to the contact ring 42. The circuit 33 continues from the contact ring 42 through the tip 49 of the arm 38 to the resistor 37 and thence through the contact prong 50 to which a wire (not shown) is connected for completing the circuit to the point 36 indicated in Fig. 3. As indicated in Fig. 4 the knob 6 includes a conventional pointer 52 and the face 46' of the control is provided with a suitable legend indicated by the numerals 53, so that various temperature settings of the refrigerator compartment may be obtained. As further explained previously, the movement of the knob 6 for effecting any change in the temperature of the refrigerator compartment effects, through the interengagement of the tab 39 and the recess 40, a corresponding movement of the arm 38 and a resultant variation in the amount of the resistor 37 included in the circuit 33. This adjustment provides compensation for changes in the temperature setting of the refrigerator compartment so that the temperature within the auxiliary compartment 10 remains within the desired range.

Since different users may desire varying temperatures in the auxiliary compartment, for example because of different preferences for spreading consistency of the butter which may be stored therein, a second adjustment is provided which permits the user to vary the temperature setting of the auxiliary compartment without affecting the compensating feature described above. This adjustment of the temperature of the auxiliary compartment is obtained by making the housing 41 rotatable. The housing 41 is rotatably mounted on the shaft 27. The housing 41 includes a downwardly extending combined pointer and handle 54 which is grasped to shift the housing 41 and the resistor 37 relative to the shaft 27. A suitable legend 55 is provided on the face 46' of the control so that the pointer 54 may be moved to a position to obtain the desired temperature in the auxiliary compartment. In the form illustrated, three positions designated as "C," "M," and "W," for cold, medium and warm settings, are provided. It will be understood, however, that the housing 41 may be set at positions intermediate those indicated by the legend. To hold the housing 41 in the desired position a detent 41a is formed on the housing and this detent is adapted to be received in any one of a plurality of recesses 46a formed in the face 46' of the control.

The operation of the adjustment for changing the temperature of the auxiliary compartment is further illustrated in Figs. 5 and 6. In Fig. 5 the pointer 54 has been set to the "Warm" position wherein a section of the resistor 37 between the points 55 and 56 is included within the circuit 32. As explained previously, subsequent shifting of the knob 6 to vary the temperature of the refrigerator compartment will shift the arm 38 and its tip 49 to include a smaller or greater amount of the resistor 37 in the circuit 33, compensating for changes in the temperature setting of the refrigerator compartment. Where the user desires a colder temperature in the auxiliary compartment, for the purpose of securing a firmer butter, for example, the housing 41 and the pointer 54 are shifted to the position shown in Fig. 6 where the pointer 54 is directed toward the "Cold" position. It can be seen that this results in a clockwise shifting of the resistor 37 relative to the position as occupied in Fig. 5 so that, with the same setting of the knob 6, a larger portion of the resistor 37 is included between the tip 49 of the arm 38 and the prong 50, thereby reducing the current and hence the power supplied to the heater 15.

It can be seen from the foregoing description that I have provided a simple heating arrangement for an auxiliary compartment for a refrigerator which provides automatic compensation for changes in the temperature setting of the refrigerated compartment so that the temperature of the auxiliary compartment under widely varying conditions remains within the desired range. Further I have provided an adjustment so that the user may vary the temperature of the auxiliary compartment independently of the setting of the main refrigerator control.

While I have shown and described a specific embodiment of my invention, I do not desire my invention to be limited to the particular construction shown and described and I intend, by the appended claims, to cover all modifications within the spirit and scope of my invention.

What I claim as new and desire to secure by Letters Patent of the United States is:

1. A refrigerator cabinet including a refrigerated compartment, a thermally insulated auxiliary compartment communicating with said refrigerated compartment, means including a refrigerating unit for cooling said refrigerated compartment, a heater for maintaining said auxiliary compartment at a higher temperature than said refrigerated compartment, means for simultaneously energizing said heater and deenergizing said refrigerating unit and for simultaneously deenergizing said heater and energizing said refrigerating unit, an adjustable control for varying the temperature of said refrigerated compartment, and means varied by adjustment of said control for varying the intensity of the energization of said heater.

2. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a resistance in series with said heater, an adjustable control for varying the temperature of said refrigerated compartment, and means actuated by adjustment of said control for varying the amount of said resistance to vary the current supplied to said heater.

3. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a resistance in series with said heater, an adjustable control for varying the temperature of said refrigerated compartment, means actuated by adjustment of said control for reducing said resistance when said adjustable control is moved to lower the temperature of said refrigerated compartment and to increase said resistance when said adjustable control is moved to raise the temperature of said refrigerated compartment.

4. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a resistance in series with said heater, an adjustable control for varying the temperature of said refrigerated compartment, means actuated by adjustment of said control for reducing said resistance when said adjustable control is moved to lower the temperature of said refrigerated compartment and to increase said resistance when said adjustable control is moved to raise the temperature of said refrigerated compartment, and means independent of said last-named means for varying said resistance to change the temperature of said auxiliary compartment.

5. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, an adjustable control for varying the temperature of said refrigerated compartment, and a knob for simultaneously moving said adjustable control and said rheostat to reduce the amount of resistance connected in series with said heater when said adjustable control is varied to maintain a lower temperature in said refrigerated compartment.

6. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, an adjustable control for varying the temperature of said refrigerated compartment, and a knob for simultaneously moving said adjustable control and said rheostat to reduce the amount of resistance connected in series with said heater when said adjustable control is varied to maintain a lower temperature in said refrigerated compartment, and means independent of said knob for varying the amount of resistance connected in series with said heater to change the temperature of said auxiliary compartment.

7. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, said rheostat including a resistor and an arm movable in electrical contact with said resistor for varying the amount of resistance in series with said heater, an adjustable control for varying the temperature of said refrigerated compartment, a knob for simultaneously moving said adjustable control and said arm to reduce the amount of resistance connected in series with said heater when said adjustable control is varied to maintain a lower temperature in said refrigerated compartment, and means for adjusting the position of said resistor to vary the amount of resistance connected in series with said heater for changing the temperature of said auxiliary compartment.

8. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, an adjustable control for varying the temperature of said refrigerated compartment, a common shaft for said adjustable control and said rheostat, and a knob for rotating said shaft to simultaneously adjust said control and said rheostat whereby the resistance connected in series with said heater is reduced when said adjustable control is set to maintain a lower temperature in said refrigerated compartment.

9. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, said rheostat including a resistor and an arm movable in electrical contact with said resistor for varying the amount of resistance in series with said heater, an adjustable control for varying the temperature of said refrigerated compartment, a common shaft for said adjustable control and said arm, a knob for rotating said shaft to simultaneously adjust said control and said arm whereby the resistance connected in series with said heater is reduced when said adjustable control is set to maintain a lower temperature in said refrigerated compartment, and a movable housing for said resistor, said housing being movable for varying the position of said resistor to change the amount of resistance connected in series with said heater for varying the temperature of said auxiliary compartment.

10. A refrigerator cabinet including a refrigerated compartment, a thermally insulated auxiliary compartment communicating with said refrigerated compartment, means including a refrigerating unit for cooling said refrigerated compartment, an electric heater for maintaining said auxiliary compartment at a higher temperature than said refrigerated compartment, means for supplying current to said heater only when said refrigerating unit is idle, a rheostat connected in series with said heater, said rheostat including an arcuate resistor and an arm rotatable in electrical contact with said resistor for varying the amount of resistance in series with said heater, an adjustable control for varying the temperature of said refrigerated compartment, a common shaft for said adjustable control and said arm, a knob for rotating said shaft to simultaneously adjust said control and rotate said arm whereby the resistance connected in series with said heater is reduced when said adjustable control is set to maintain a lower temperature in said refrigerated compartment, and a rotatable housing mounted on said shaft for rotation relative thereto, said arcuate resistor being fixedly secured to said housing for rotation therewith whereby rotation of said housing relative to said shaft varies the amount of resistance connected in series with said heater to change the temperature of said auxiliary compartment.

11. A refrigerator cabinet including a refrigerated compartment, a thermally insulated auxiliary compartment communicating with said refrigerated compartment, means including a refrigerating unit for cooling said refrigerated compartment, a switch for controlling the energization and deenergization of said refrigerating unit, an electric heater for maintaining said auxiliary compartment at a higher temperature than said refrigerated compartment, a circuit including said heater and a rheostat in series connected across said switch whereby said heater is energized only when said switch is open and said refrigerating unit is deenergized, an adjustable control for varying the temperature of said refrigerated compartment, and means for simultaneously adjusting said control and said rheostat whereby the resistance placed in said circuit by said rheostat is reduced when said adjustable control is moved to a position for maintaining a lower temperature in said refrigerated compartment.

12. A refrigerator cabinet including a refrigerated compartment, a thermally insulated auxiliary compartment communicating with said refrigerated compartment, means including a refrigerating unit for cooling said refrigerated compartment, a switch for controlling the energization and deenergization of said refrigerating unit, an electric heater for maintaining said auxiliary compartment at a higher temperature than said refrigerated compartment, a circuit including said heater and a rheostat in series connected across said switch whereby said heater is energized only when said switch is open and said refrigerating unit is deenergized, an adjustable control for varying the temperature of said refrigerated compartment, a common shaft for said control and said rheostat, and a knob for rotating said shaft to simultaneously adjust said control and said rheostat whereby the resistance placed in said circuit by said rheostat is reduced when said control is adjusted to maintain a lower temperature in said refrigerated compartment.

ERNEST F. SHELL.

REFERENCES CITED

The following references are of record in the file of this patent:

UNITED STATES PATENTS

| Number | Name | Date |
| --- | --- | --- |
| 2,152,486 | Knight | Mar. 28, 1939 |
| 2,223,234 | Stemme | Nov. 26, 1940 |
| 2,317,840 | Wild | Apr. 27, 1943 |
| 2,363,375 | Wild | Nov. 21, 1944 |
| 2,378,816 | Wild | June 19, 1945 |
| 2,489,049 | Root | Nov. 22, 1949 |
| 2,594,023 | Hubacker | Apr. 22, 1952 |